United States Patent [19]

Bakker et al.

[11] Patent Number: 4,591,757

[45] Date of Patent: May 27, 1986

[54] COLOR DISPLAY TUBE HAVING SCREEN WITH SHARPLY CURVED SURFACES

[75] Inventors: Gijsbertus Bakker; Gerhardus J. Rorije, both of Eindhoven, Netherlands

[73] Assignee: U.S. Philips Corporation, New York, N.Y.

[21] Appl. No.: 607,321

[22] Filed: May 4, 1984

[30] Foreign Application Priority Data

Jun. 12, 1983 [NL] Netherlands ........................ 8304178

[51] Int. Cl.[4] ........................ H01J 29/10; H01J 61/30; H04N 5/64

[52] U.S. Cl. .................................... 313/461; 313/474; 220/2.1 A; 358/255

[58] Field of Search .................... 313/461, 474, 477 R, 313/478; 220/2.1 A, 2.3 A; 358/225

[56] References Cited

U.S. PATENT DOCUMENTS 3,089,052 5/1963 Bisbing ............................ 220/2.1 A

*Primary Examiner*—Davis L. Willis
*Assistant Examiner*—William L. Oen
*Attorney, Agent, or Firm*—Robert J. Kraus

[57] ABSTRACT

A color display tube comprising a faceplate including a display window connected to a skirt which is substantially parallel to the axis of the envelope via a sharply curved transition portion. The set of points defining where the inner surface of the window meets the inner surface of the transition part is formed by a closed line l. The set of points defining where the outer surface of the window meets the outer surface of the transition portion is formed by a closed line m. A display screen of luminescent material provided on the inner surface of the display window has a substantially rectangular boundary which coincides substantially with the line l. A large viewing angle $\alpha$ is obtained within which no distortion of the picture edge occurs when, from any point Q in the line m, the shortest connection line to the line l encloses with a normal line h (normal to the outer surface of the window) an angle $\gamma$, for which the relationship holds that:

$$n \sin \gamma = \sin (\alpha - \beta)$$

wherein n is the refractive index of the glass of the display tube, $\alpha$ is the maximum viewing angle, between 55° and 65°, defined with respect to the tube axis, and $\beta$ is the angle between the normal line h and a line parallel to the tube axis.

3 Claims, 5 Drawing Figures

COLOR DISPLAY TUBE HAVING SCREEN WITH SHARPLY CURVED SURFACES

BACKGROUND OF THE INVENTION

The invention relates to a colour display tube comprising an envelope consisting of a neck, a cone and a faceplate including a flat or slightly convex display window which changes into a skirt which is substantially parallel to the axis of the envelope via a sharply-curved transistion portion. A first set of points defining where the inner surface of the display window meets the sharply-curved inner surface of the transition portions forms a closed line 1. A second set of points defining where the outer surface of the display window meets the sharply-curved outer surface of the transition portion forms a closed line m. The display window has on its inner surface a substantially rectangular display screen which comprises a material luminescing in at least one colour. Means is provided in the neck to produce at least one electron beam.

The invention further relates to a display device comprising such a colour display tube.

Recently developed display tubes have flatter display windows, as described, for example, in Journal of Electronic Engineering, August, 1982, P. 24. This journal describes a display tube having a substantially rectangular display window having an outer contour which is slightly barrel-shaped. This does not be cause any problem with tubes which are placed in a cabinet and the outer circumference of which is concealed from the viewer by a bezel, because the inner edge of the bezel can adjoin the edge of the display screen. However for tubes having a display window which slightly projects beyond the cabinet (so-called push-through mounting), where a bezel can not be used, the substantially rectangular display screen on the inner wall of the much less rectangular display window dark areas above and below and on the left and on the right of the displayed picture. These areas vary in width and are annoying to the viewer.

Moreover, in said push-through mounted tubes a problem occurs in the vicinity of in the transistion portion of the faceplate, connecting the display window to the skirt. In this portion a lens is formed by the curvature of the glass, causing an annoying distortion of the edge of the display window for a viewer who views the picture at a large angle to the tube axis. So long as the boundary of the luminescent material of the display screen is situated at ample distance from the transition area, this problem does not occur. However, this has for its result that the display window in that case is not filled optimally by the display screen.

It is the object of the invention to provide a colour display tube the display screen of which fills the display window optimally and in which the annoying distortion of the edge of the displayed picture for a viewer who views the picture at the maximally desired viewing angle does not occur.

A display tube of the kind described in the opening paragraph is characterized according to the invention in that the boundary of the luminescent material of the display screen substantially coincides with the line 1, and from any point Q in the line m the shortest connection line to the line 1 encloses with a normal line h (normal at Q to the outer surface of the window) an angle $\gamma$, for which the relationship holds that:

$$n \sin \gamma = \sin (\alpha - \beta)$$

wherein

- n is the refractive index of the glass of the display tube,
- $\alpha$ is the maximum viewing angle, between 55° and 65°, defined with respect to the tube axis, and
- $\beta$ is the angle between the normal line h and a line parallel to the tube axis.

The invention is based on the recognition of the fact that, if the above relationship is satisfied, the disturbing lens action which is formed by the transition area does not occur within the viewing angle $\alpha$.

In other words, the place where the outer surface of the window meets the sharply-curved transition surface is chosen with respect to the place where the inner surface of the window meets the inner, sharply-curved transition portion in such manner that the above relationship is satisfied. It should be noted that in flatter display windows having full display screens according to the invention edge distortion is more of a problem than in display tubes having more convex display windows.

A further embodiment of a display tube according to the invention is characterized in that the outer circumference of the display window is substantially parallel to the boundary of the luminescent material of the display screen. The advantage hereof is that a dark edge which is uniform in width is obtained around the display screen. The known barrel-shaped outer contour was assumed to be necessary in connection with the stringent requirements as regards implosion safety for the tube. Experiments and comparative calculations have demonstrated that a display window having a substantially rectangular outer contour does not lose its implosion safety under either static or dynamic loads as compared with the known tube which has a substantially flat display window and a barrel-shaped contour.

The invention is of importance for tubes having black matrix material between the elements of luminescent material of the display screen, where the matrix material extends to beyond the boundary of the luminescent material of the display screen. However, the invention is also of importance for tubes without such matrix material in which an aluminium film ("metal backing") is provided over the luminescent material and extends to beyond the boundary of the luminescent material. In fact, in the former case a wider darker edge is formed without using the invention and in the second case a shining edge (aluminium) is formed which is surrounded by a dark edge caused by the skirt.

By using the invention, only a narrow dark edge is obtained around the rectangular display screen which is everywhere equally wide and even emphasises the rectangularity of the display screen. Moreover, the narrow dark edge which has substantially the same width everywhere, in an operating tube leads to a picture presentation which is attractive to the viewer. Notably, the edge does not lead to a perceptive distortion of, for example, a number of straight columns of digits displayed on the display screen. In a tube which is not in operation the narrow edge which has substantially the same width everywhere around the display screen leads to an aesthetic design.

BRIEF DESCRIPTION OF THE DRAWING

The invention will now be described in greater detail, by way of example, with reference to a drawing, in which.

DESCRIPTION OF THE PREFERRED EMBODIMENT

Figure 1:
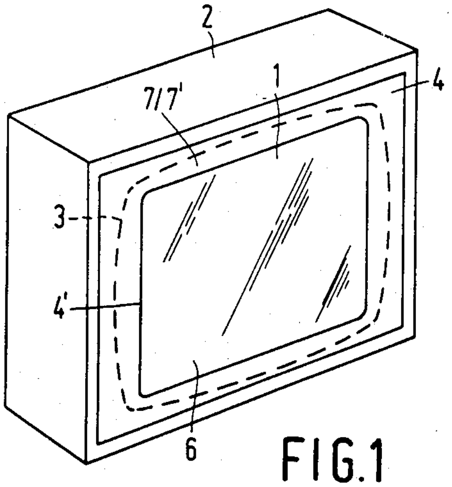
FIG.1 PRIOR ART
FIG. 1 is a perspective elevation of a prior art television set having a bezel around the display screen.

FIG. 1 is a perspective elevation of a prior art television set. A display tube having a display window 1 is connected in a cabinet 2 by means of suspension means not shown. The tube comprises a substantially rectangular display screen 6 on the inner wall of the much less rectangular display window 1 which has a slightly barrel-shaped outer contour 3. As a result of this a dark edge which varies in width is formed around the display screen 6 and is covered by a bezel 4. The inner edge 4' of the bezel presents to the viewer the visual boundary of the luminescent material of the display screen 6 on the inner wall of the display window 1.

Figure 2:
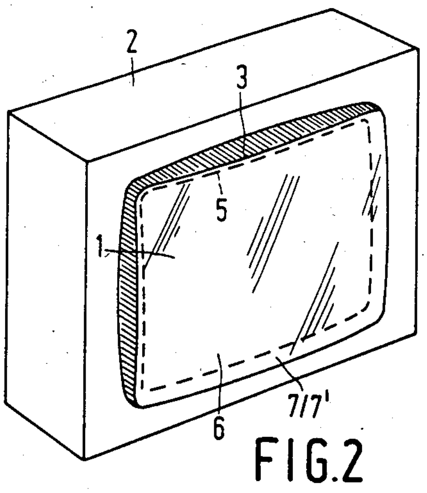
FIG.2 PRIOR ART
FIG. 2 shows a prior art set without a bezel but with push-through mounting of the display tube.

FIG. 2 is a perspective elevation of a television set in which a display tube of the type as used in the FIG. 1 set is used. In this set the display window 1 slightly projects beyond the cabinet 2. This is known as push-through mounting of the display tube. In this type of tube mounting, use of the bezel 4 described with reference to FIG. 1 is not possible. The substantially rectangular display screen 6 bounded by the broken line 5 on the inner wall of the much less rectangular display window 1 leaves dark or shining areas 7, 7' above and below and on the left and on the right of the displayed picture. These areas vary in width and are disturbing to the viewer. The areas 7 and 7' are dark in the case of a matrix tube. They are partly shining (area 7') in the case of a tube in which no matrix material is used, because the aluminium present beyond the boundary of the luminescent material is visible to the viewer. This is shown more clearly in FIG. 3 which is a front elevation of the tube used in the FIG. 2 set. In a tube having an outer diagonal of the substantially rectangular display window of 51 cm the distance from the boundary 5 of the display screen 6 (broken lines in the figure) to the outer contour 3 of the display window in the diagonal direction was 18.3 mm (indicated by an arrow a) and on the centres of the long and short sides 26.6 mm (indicated by an arrow b) and 23.8 mm (indicated by an arrow c), respectively.

Figure 4:
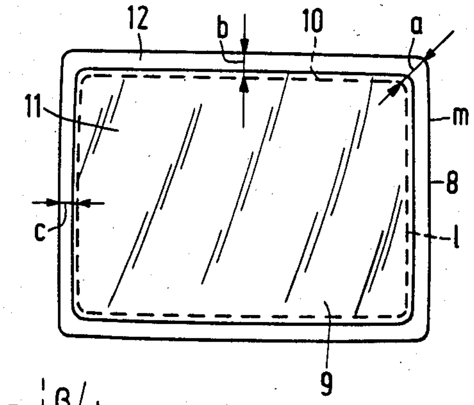
FIG. 4 is a front elevation of a display tube according to the invention.

FIG. 4 is a front elevation of a display tube according to the invention in which the outer circumference 8 of the display window 9 is substantially parallel to the boundary 10 of the luminescent material of the display screen 11. As a result of this a dark edge 12 which is uniform in width is obtained around the substantially rectangular display screen 11.

Figure 3:
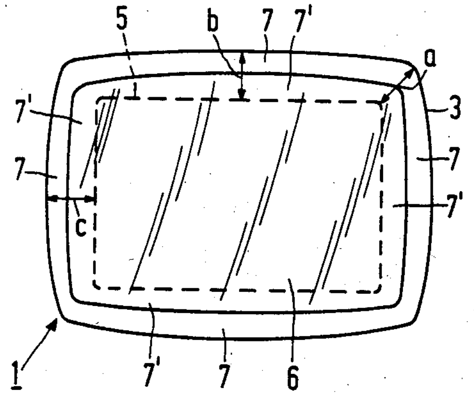
FIG.3 PRIOR ART
FIG. 3 is a front elevation of the display tube of the set shown in FIG. 2.

The values of a, b and c defined in a manner corresponding to that of FIG. 3 are 19.5, 20.9 and 20.0 mm, respectively. In the tube according to the invention the variation in the width of the dark edge is less than 1.5 mm, which is hardly visible. In the known tube the variation is well over 8 mm, which causes a disturbing effect. The sides of the outer circumference 8 have a radius of curvature of approximately 6.5 m.

Figure 5:
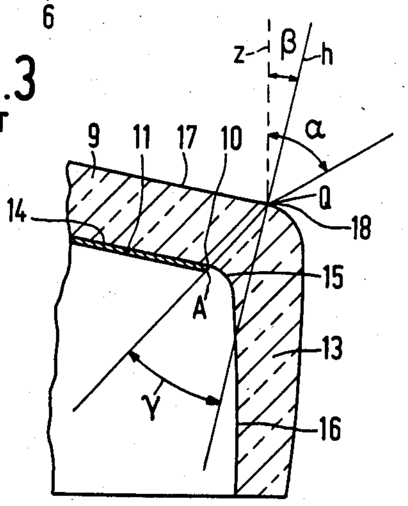
FIG. 5 is a cross-sectional view of a part of the edge and the skirt of the faceplate of the display tube shown in FIG. 4.

FIG. 5 is a cross-sectional view of a part of the edge and skirt 13 of the faceplate shown in FIG. 4. The inner surface 14 of the display window 9 is connected to the inner surface 16 of the skirt 13 via a sharply inner curved surface 15. The radius of curvature of the sharply curved inner surface 15 is approximately 6 mm. The boundary 10 of the luminescent material of the display screen 11 substantially coincides with a line 1 (see FIG. 4) which joins the points where the surface 14 of the display window 9 meets the surface 15. The usual thin aluminium film, not shown, is vapour-deposited over the luminescent material of the display screen 11. As a result of the small radius of curvature of the sharply curved surface 15, and the extension of the luminescent material of the display screen 11, the aluminium film as seen from the front of the tube is hardly visible, or only visible in the form of a very narrow edge. In the case of a matrix tube the part of the aluminium film projecting beyond the boundary 10 is concealed from the viewer's eye by black matrix material. As is shown in FIG. 4, the dark edge 12 in that case becomes wider only to a very small extent.

A first set of points defining where the inner surface 14 of the display window 9 meets the sharply-curved inner surface 15 forms a closed line 1 (see FIG. 4). A second set of points defining where the outer surface 17 of the display window 9 meets the sharply-curved outer surface 18 forms a closed line m (see FIG. 4).

Because the boundary 10 of the luminescent material of the display screen 11 substantially coincides with the line 1 (see FIG. 4), and because at any point Q of the line m (see also FIG. 4) the shortest connection line (A- Q) to the line 1 encloses with the normal line h (to the outer window surface 17 of the window 9) an angle $\gamma$ for which the rleationship holds that:

$$n \sin \gamma = \sin (\alpha - \beta)$$

wherein

- n is the refractive index of the glass of the display tube,
- $\alpha$ is the maximum viewing angle between 55° and 65° defined with respect to the tube axis, and $\beta$ is the angle between the normal line h and a line Z parallel to and the tube axis, the above-described distortion does not occur within the viewing angle $\alpha$.

For further information reference is made to the Netherland Patent Applications 8304179, 8304180 and 8304181 corresponding to U.S. Application Ser. Nos. 607,359, 607,323, and 607,328, respectively, filed simultaneously with the present Application.

What is claimed is:

1. A color display tube comprising an envelope including a neck, a cone and a faceplate arranged along a longitudinal tube axis, said faceplate comprising a substantially flat display window disposed perpendicular to the axis, a skirt parallel to the axis, and a sharply-curved transition portion connecting the display window to the skirt, said display window having a substantially flat inner surface which meets a sharply-curved inner surface of the transition portion at a peripheral line l and having a substantially flat outer surface which meets a sharply-curved outer surface of the transition portion at a peripheral line m, said tube including a luminescent screen on the inner surface of the display window and an electron beam producing means in the neck for directing an electron beam at said luminescent screen;

characterized in that:

(a) the luminescent screen boundary substantially corresponds with the line l; and (b) the places where the sharply-curved inner and outer surfaces meet the respective flat inner and outer surfaces are disposed such that the shortest connection line between line l and any point Q on the line m encloses an angle $\gamma$ with a line h perpendicular to the outer surface of the faceplate at the point Q, said angle $\gamma$ fulfilling the requirement:

$$n \sin \gamma = \sin (\alpha - \beta)$$

where n is the refractive index of the faceplate material, $\alpha$ is the minimum desired viewing angle with respect to the tube axis, and $\beta$ is the angle between the line h and a line passing through the points Q parallel to the tube axis.

2. A colour display tube as claimed in claim 1, characterized in that the outer circumference of the display window is substantially parallel to the boundary of the luminescent material of the display screen.

3. A display device comprising a colour display tube as claimed in claim 1 or 2.

* * * * *